United States Patent
Ko et al.

(10) Patent No.: US 9,005,457 B2
(45) Date of Patent: Apr. 14, 2015

(54) COUNTER ELECTRODE FOR DYE-SENSITIZED SOLAR CELL AND PREPARATION METHOD THEREOF

(75) Inventors: Min-Jae Ko, Seoul (KR); Ki-Cheon Yoo, Seoul (KR); Hong-Gon Kim, Seoul (KR); Doh-Kwon Lee, Seoul (KR); Bong-Soo Kim, Seoul (KR); Kyung-Kon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 30 days.

(21) Appl. No.: 13/345,415

(22) Filed: Jan. 6, 2012

(65) Prior Publication Data

US 2013/0125970 A1 May 23, 2013

(30) Foreign Application Priority Data

Nov. 22, 2011 (KR) .................. 10-2011-0122385

(51) Int. Cl.
 - *B29D 11/00* (2006.01)
 - *H01G 9/20* (2006.01)
 - *G02B 6/136* (2006.01)
 - *B32B 37/00* (2006.01)

(52) U.S. Cl.
 CPC .............. *H01G 9/2022* (2013.01); *G02B 6/136* (2013.01); *Y02E 10/52* (2013.01); *Y02E 10/542* (2013.01); *B32B 37/025* (2013.01); *B32B 2457/12* (2013.01); *B32B 2457/20* (2013.01); *H01G 9/2031* (2013.01); *H01G 9/2059* (2013.01)

(58) Field of Classification Search
 None
 See application file for complete search history.

(56) References Cited

U.S. PATENT DOCUMENTS

| | | | | |
|---|---|---|---|---|
| 6,645,833 B2 * | 11/2003 | Brendel | | 438/458 |
| 2006/0219294 A1 * | 10/2006 | Yabuuchi et al. | | 136/263 |
| 2007/0056628 A1 * | 3/2007 | Park et al. | | 136/263 |
| 2010/0024877 A1 * | 2/2010 | Duerr et al. | | 136/256 |
| 2010/0154880 A1 * | 6/2010 | Lai et al. | | 136/256 |
| 2010/0243020 A1 * | 9/2010 | Norton et al. | | 136/244 |
| 2010/0255632 A1 * | 10/2010 | Ishibashi et al. | | 438/97 |

FOREIGN PATENT DOCUMENTS

| | | |
|---|---|---|
| KR | 10-2007-0059794 | 6/2007 |
| KR | 10-2007-0078530 | 8/2007 |
| KR | 10-2009-0028007 | 3/2009 |
| WO | 2011/111932 A2 | 9/2011 |

OTHER PUBLICATIONS

Office Action issued for related Korean Patent Application No. 10-2011-0122385, dated Mar. 25, 2013, and its English summary provided by client.

Notice of Allowance issued for related Korean Patent Application No. 10-2011-0122385, dated May 30, 2013, and its English machine translation by Google translate.

\* cited by examiner

*Primary Examiner* — Shamim Ahmed
*Assistant Examiner* — Bradford Gates
(74) *Attorney, Agent, or Firm* — Ladas & Parry, LLP

(57) ABSTRACT

The present invention relates to a counter electrode for DSSC which includes a porous membrane include a carbon-based material calcinated at high temperature and a platinum nanoparticles and maintains higher conductivity than a thin membrane and in which the electrolyte moves smoothly, a method of preparing the same, and a DSSC using the same which is improved in photoelectric efficiency.

7 Claims, 7 Drawing Sheets

Fig. 4
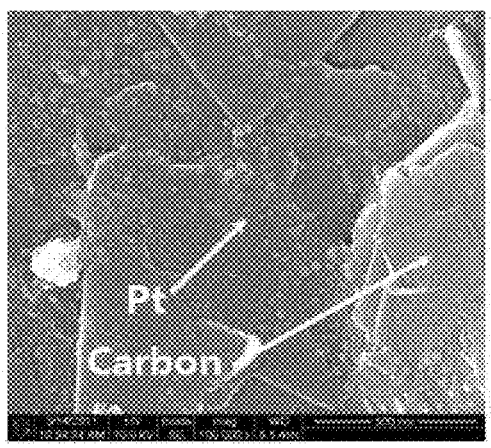
(a)
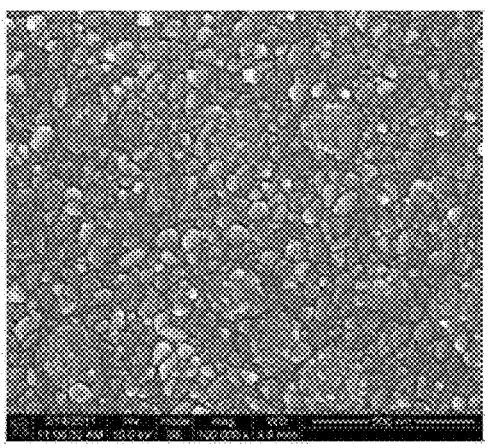
(b)

COUNTER ELECTRODE FOR DYE-SENSITIZED SOLAR CELL AND PREPARATION METHOD THEREOF

CROSS-REFERENCE TO RELATED APPLICATION

This application claims priority to and the benefit under 35 U.S.C. §119(a) of a Korean patent application No. 10-2011-0122385 filed on Nov. 22, 2011, the entire disclosure of which is incorporated herein by reference for all purposes.

FIELD OF THE INVENTION

The present invention relates to a counter electrode for dye-sensitized solar cell (hereinafter DSSC), a preparation method thereof, and a DSSC using the same.

BACKGROUND OF THE INVENTION

DSSC is represented by a photoelectrochemical solar cell announced by Gratzel et al., Switzerland, in 1991, and it is generally comprised of a photosensitive dye absorbing visible rays, metal oxide nano particles having wide band gap energy, a counter electrode which catalyses by platinum (Pt), and an electrolyte interposed between them. The DSSC has advantages of that the production cost is cheaper than existing silicon solar cells or compound semiconductor solar cells, the efficiency is higher than organic solar cells, and it is ecofriendly and can realize various colors.

Particularly, flexible DSSC is receiving more attention in that it can be used for self-charging a mobile phone or a next generation PC such as a wearable PC and the like, or can be utilized by attaching the same to clothes, a cap, an automotive glass, a building, and the like.

Meanwhile, the platinum catalyst needed for preparing the counter electrode of the DSSC is deposited by a sputtering method requiring a vacuum process at present. Furthermore, existing methods have prepared the counter electrode by calcinating a platinum compound at high temperature so as to prepare platinum nano-particles, or by putting a carbon-based material (carbon, carbon nano-tube, graphene) on a TCO substrate so as to use the same instead of the platinum catalyst.

However, these methods must use an expensive TCO electrode, and they need a vacuum process or a high temperature process. Furthermore, when only the carbon-based material is used, there is a problem of that the photoelectric efficiency of the solar cell becomes inferior to the cell using the platinum. Moreover, all of the processes must be carried out at low temperature in order to form the counter electrode directly on the flexible plastic substrate, and thus there is a problem of that the property of the electrode deteriorates.

SUMMARY OF THE INVENTION

To resolve said problems of prior arts, it is an aspect of the present invention to provide a method of preparing the counter electrode for DSSC which can take roles of a catalyst and an electrode at the same time, by using a transfer method.

It is another aspect of the present invention to provide a method of applying the counter electrode as the counter electrode of DSSC irrespective of the kind of the substrate (a glass substrate, a flexible substrate, a metal substrate, and the like).

It is still another aspect of the present invention to provide a DSSC which can be inexpensive and has high photoelectric efficiency, by using the counter electrode.

BRIEF DESCRIPTION OF THE DRAWINGS

FIG. 4 is SEM photographs of the flexible counter electrodes according to Example 1 (a) of the present invention and Comparative Example 1 (b).

EXPLANATION OF REFERENCE NUMERALS OF THE DRAWINGS

Figure 1:
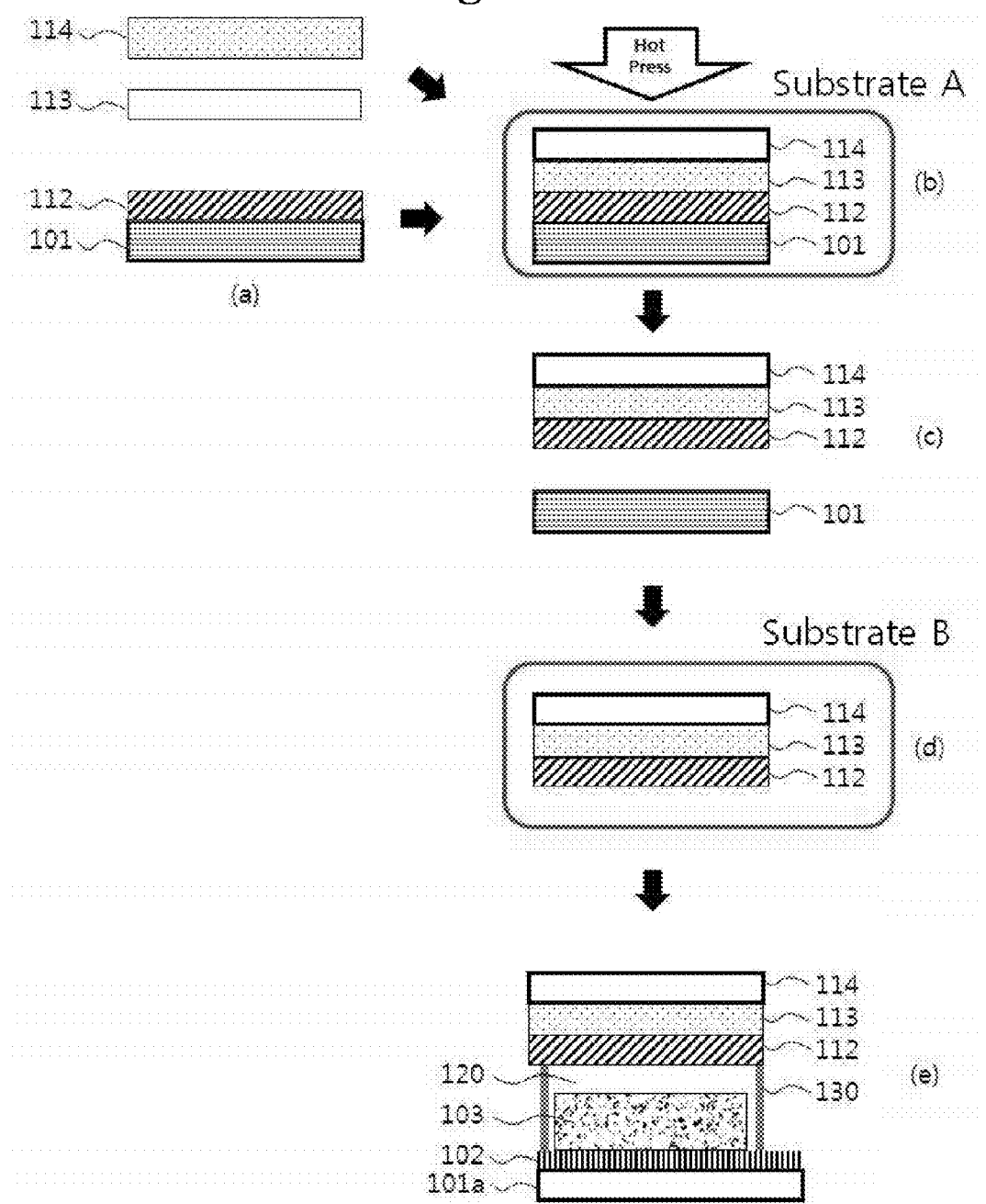
FIG. 1 is a schematic diagram for explaining the method of preparing the flexible counter electrode and the DSSC including the counter electrode according to one embodiment of the present invention.

100: photoelectrode
101a: the third substrate
102: conductive film
103: dye-adsorbed porous membrane
110: counter electrode
101: the first substrate, transparent flexible substrate
111: catalyst layer
112: porous membrane including carbon-based material and platinum nano-particles
113: adhesive layer
114, 114a: the second substrate, flexible substrate
120: electrolyte
130: polymer adhesive layer

DETAILED DESCRIPTION

The present invention provides a method of preparing a counter electrode for DSSC, including the steps of:

(a) preparing substrate A including the first substrate which has high temperature resistance and is not deformed at the temperature of 500° C. or less, a porous membrane including a carbon-based material and platinum nano-particles, an adhesive layer, and the second substrate; and (b) preparing substrate B including the second substrate, and the adhesive layer and the porous membrane formed on the second substrate, by separating the first substrate having high temperature resistance from substrate A and transferring the porous membrane and the adhesive layer to the second substrate with a transfer method.

The present invention also provides a counter electrode for DSSC prepared by the method disclosed above, and including the second substrate, the adhesive layer formed on one face of the second substrate, and the porous membrane including the carbon-based material and the platinum nano-particles formed on the adhesive layer, wherein the second substrate is a metal substrate, a glass substrate, a plastic substrate which is a flexible substrate, a fabric substrate, or a ceramic substrate.

The present invention also provides a flexible DSSC including the flexible counter electrode, a photoelectrode arranged opposite to the counter electrode at a regular interval, and an electrolyte filling the space between the counter electrode and the photoelectrode.

Hereinafter, the present invention is explained in more detail.

As disclosed above, the method of depositing platinum on a TCO (transparent conducting oxide)-coated substrate, or the method of using the carbon-based material having catalytic characteristics on the TCO substrate instead of the platinum has been generally known as the method of preparing a flexible semiconductor counter electrode. However, these methods must use the expensive TCO electrode and need a vacuum process, and there is a problem of that the photoelectric efficiency of the solar cell using the carbon-based material oxide is inferior to that using platinum.

By using the structure provided by the present invention, the counter electrode for DSSC having superior photoelectric efficiency can be provided on the substrate without the TCO with a simple process.

Therefore, the present invention provides a method of preparing the counter electrode which is not only superior in photoelectric efficiency but also inexpensive because it does not need the TCO and the vacuum process, and can be used irrespective of the substrate, by using the carbon-based material having catalytic characteristics and platinum.

Furthermore, when the present invention is applied to a flexible substrate among the substrates, it is more effective in being applied to a mobile phone or a next generation PC such as a wearable PC and the like.

Then, preferable embodiments of the present invention are explained by referring to the annexed drawings so that the present invention may easily be carried out by a person with ordinary skill in the art to which the present invention pertains. At this time, as a person with ordinary skill in the art to which the present invention pertains can understand easily, the embodiments disclosed below are only for exemplifying the present invention, and they may be modified into various forms within the limit not exceeding the concept and the range of the present invention. In the drawings, same or similar parts are represented by same reference numerals, if possible.

Furthermore, in the present invention, when one part is mentioned as 'on' or 'above' the other part, the part may be just above the other part, or another part may be between them. Contrastively, when one part is mentioned as 'just above' the other part, it does not include another part between them.

Furthermore, in the present invention, the terms of the first, the second, and the like are used for explaining various parts, components, areas, layers, and/or sections partitively, however, they are not limited to or by them. Therefore, the terms are only used for distinguishing certain parts, components, layers, or sections from the other parts, components, layers, or sections.

The technical terms used here are only for mentioning specific embodiments, and they do not intent to limit the present invention. The term of "comprising" used in the specification specifies specific characteristics, areas, essence, steps, motions, elements, and/or components, and it does not exclude the existence or addition of the other characteristics, areas, essence, steps, motions, elements, and/or components.

The term of 'nano' disclosed in the present specification means nano scale, and it may include micro unit. Furthermore, the term of 'nano-particle' disclosed in the specification includes all types of particles having nano scale.

In the present specification, 'counter electrode' means 'a counter electrode' which can be used in DSSC. And, 'porous membrane including carbon-based materials and platinum nano-particles' in the present invention means 'an electrode and a catalyst layer used for the counter electrode'.

Meanwhile, according to a preferable embodiment of the present invention, a method of preparing a counter electrode for DSSC, including the steps of: (a) preparing substrate A including the first substrate which has high temperature resistance and is not deformed at the temperature of 500° C. or less, a porous membrane including a carbon-based material and platinum nano-particles, an adhesive layer, and the second substrate; and (b) preparing substrate B including the second substrate, and the adhesive layer and the porous membrane formed on the second substrate, by separating the first substrate having high temperature resistance from substrate A and transferring the porous membrane and the adhesive layer to the second substrate with a transfer method is provided.

The first substrate of the present invention means a high temperature resistant substrate which can endure the high temperature of 400 to 500° C., it also means the substrate having a characteristic of not being deformed at the temperature where the porous membrane including the carbon-based material and the platinum nano-particles is calcinated and shows the stability of membrane and the high conductivity, not limited to the temperature. Furthermore, the second substrate means a substrate to which the adhesive layer can be attached, and any substrate to which the adhesive layer can be attached may be used substitutively irrespective of the kinds.

The present invention includes a method of applying the porous membrane including the carbon-based material and the platinum nano-particles which is formed on the first substrate by calcination at high temperature and has high temperature resistance to the second substrate by using a transfer method.

Namely, the present invention forms the porous membrane by coating a paste including the carbon-based material and the platinum nano-particle layer with a certain thickness on the first substrate having high temperature resistance such as a glass substrate not including a conductive film by using a common coating method, and calcinating the same at high temperature. And then, the counter electrode is prepared by applying an adhesive layer and the second substrate on the porous membrane, and separating the porous membrane including the carbon-based material and the platinum nano-particle layer from the first substrate having high temperature resistance with a transfer method so as to transfer the porous membrane including the carbon-based material and the platinum nano-particle layer to the second substrate.

Such method of preparing the counter electrode of the present invention follows the method illustrated in FIG. 1 preferably. FIG. 1 is a schematic diagram for explaining the method of preparing the flexible counter electrode and the DSSC including the counter electrode according to the present invention.

Referring to FIG. 1, the present invention forms the porous membrane 112 including the carbon-based material and the platinum nano-particles and taking a role of catalyst, by preparing the first substrate 101 having high temperature resistance, coating the paste for forming the porous membrane including the carbon-based material and the platinum nano-particles on the substrate, and calcinating the same at high temperature (FIG. 1 (a))

And then, the present invention prepares substrate A including the first substrate 101 having high temperature resistance, the porous membrane 112 including the carbon-based material and the platinum nano-particles, the adhesive layer 113, and the second layer 114, by stacking the adhesive layer 113 and the second layer 114 on the porous membrane 112 in order and heat-pressing the same (FIG. 1 (b)).

In succession, the preparation of the counter electrode (FIGS. 1 (c) and (d)) is completed by preparing substrate B including the second substrate 114, the adhesive layer 113 and the porous membrane 112 formed on the second substrate by separating the first substrate 101 having high temperature resistance from substrate A with a transfer method using HF solution, transferring the porous membrane 112 and the adhesive layer 113 to the second substrate.

The counter electrode prepared by above method can be used to common DSSCs, and the present invention can provide the DSSC by using the same in company with a photoelectrode and an electrolyte.

Therefore, the present invention can prepare the DSSC by arranging the photoelectrode opposite to the flexible counter electrode at a regular interval, injecting the electrolyte 120 therebetween, and sealing the same with a polymer adhesive 130 (FIG. 1 (e)).

Preparation of Substrate A

The step of preparing substrate A may include the steps of forming the porous membrane 112 including the carbon-based material and the platinum nano-particles on one face of the first substrate 101 having high temperature resistance, stacking the adhesive layer 113 and the second substrate 114 on the porous membrane 112 including the carbon-based material and the platinum nano-particles in order, and heat-pressing the substrate.

The present invention prepares substrate A that the first substrate 101 having high temperature resistance—the porous membrane 112—the adhesive layer 113—the second substrate 114 are bonded each other in order, by stacking the adhesive layer such as a transparent thermal bonding polymer film and the second substrate on the porous membrane, and providing heat and pressure to the same.

In the present invention, the porous membrane may be formed by coating the paste including the carbon-based material, the platinum nano-particles, a binder, and a solvent on one face of the first substrate having high temperature resistance, and heat-treating the same at the temperature of 450 to 500° C. for 1 to 2 hours.

Furthermore, the porous membrane is an electrode & catalyst layer, and the thickness is not limited particularly but it may be 1 to 100 μm preferably.

The weight ratio of the carbon (the carbon-based material) and the platinum nano-particles of the paste may be 1:99 to 99:1, and preferably 90:10 to 95:5.

The paste may be prepared by a method well known in the related art, and the method is not limited particularly. For example, the paste may be prepared by mixing the carbon-based material and the platinum nano-particles with a solvent so as to prepare a colloid solution having the viscosity of $5 \times 10^4$ to $5 \times 10^5$ cps in which a metal oxide is dispersed, adding the binder resin thereto and mixing the same, and eliminating the solvent with a distiller. As the other method, the paste may be prepared by mixing the carbon-based material, the binder, and the solvent so as to prepare a paste firstly, and adding the platinum nano-particles thereto. When the later method is used, the paste may be prepared by adding 1 to 20 parts by weight of the platinum nano-particles based on 100 parts by weight of the paste including 5 to 30 weight % of the carbon-based material, 0.01 to 10 weight % of the binder, and the residual quantity of the solvent.

The mixing ratio and the kind of the carbon-based material and the platinum nano-particles, the binder resin, and the solvent are not limited particularly, and any method known in the related art may be used if the weight ratio of the carbon-based material and the platinum nano-particles is satisfied. Preferably, the carbon-based material may be at least one selected from the group consisting of active carbon, graphite, carbon nano-tube, carbon black, and graphene. Furthermore, the binder resin may be polyethyleneglycol, polyethyleneoxide, polyvinylalcohol, polyvinylpyrrolidone, ethylcellulose, and the like. Furthermore, the solvent may be ethanol, methanol, terpineol, lauric acid, and the like.

The particle sizes of the carbon-based material and the platinum nano-particle in the paste are preferably 10 nm to 100 μm (average particle diameter), respectively.

Furthermore, any substrate which can be calcinated at high temperature can be used for the coating of the paste as the first substrate 101 having high temperature resistance, for example, a metal substrate, a glass substrate, or a ceramic substrate may be used, and preferably a glass substrate is used. Furthermore, since the substrate does not have to be transparent, the first substrate does not include a conductive film.

Furthermore, any substrate which can be attached to the adhesive layer 113 may be used as the second substrate, for example, a metal substrate, a glass substrate, a plastic substrate which is a flexible substrate, a fabric substrate, or a ceramic substrate may be used. Preferably, the second substrate may be a plastic substrate which is a flexible substrate. Furthermore, the thickness of the second substrate may be 50 to 500 μm however it is not limited to this.

The plastic substrate may be at least one selected from the group consisting of polyethylene terephthalate (PET); polyethylene naphthalate (PEN); polycarbonate (PC); polypropylene (PP); polyimide (PI); triacetylcellulose (TAC); polyether sulfone; an organic modified silicate of 3-dimensional network structure which is formed by hydrolysis-condensation reaction of at least one organic metal alkoxides selected from the group consisting of methyltriethoxysilane (MTES), ethyltriethoxysilane (ETES), and propyltriethoxysilane (PTES); a copolymer thereof; and a mixture thereof.

A common method such as screen printing, spin coating, doctor blade, and the like may be used as the coating method for forming the porous membrane, the adhesive layer, and the like, and the method is not limited particularly.

Furthermore, the adhesive layer may be formed by using a thermal bonding polymer film, a paste including a thermal bonding polymer, or an adhesive which can bond the porous membrane and the second substrate. Furthermore, a transparent material or an opaque material may be used as the adhesive layer. Preferably, the adhesive layer may include at least one compounds selected from the group consisting of a thermosetting resin, a thermoplastic resin, an UV resin, an acrylic resin, an acrylic resin anaerobic, an acrylic emulsion, an acrylic pressure-sensitive adhesive tapes, α-olefin resin, a polyurethane resin, a polyurethane solvent type, an urethane emulsion, a polyurethane hot melt (TPU), a reactive hot melt adhesive (R-HM), an ethercellulose, an ethylene-vinylacetate copolymer emulsion, an ethylene-vinylacetate copolymer hot melt, an epoxy resin, an epoxy emulsion, a polyvinyl chloride solvent type (PVC), a polyvinyl acetate emulsion, a polychloroprene rubber (CR), α-cyanoacrylate, silicone adhesives, modified silicone adhesives, a water based polymer-isocyanate, a styrene-butadiene rubber solution type, a styrene-butadiene rubber latex, a nitrile rubber (NBR), a nitrocellulose, a phenolic resin, a polyamide hot melt (PA), a polyimide, a polyolefin hot melt (TPO), a polyvinyl acetate solvent type (PVAc), a polystyrene solvent type (PS), a polyvinylalcohol (PVA), a polyvinylpyrrolidone (PVP), a polyvinylbutyral (PVB), a polybenzimidazole (PBI), a polymethylmethacrylate solvent type (PMMA), a melamine resin, an urea resin (UF), and a resorcinol resin as a polymer adhesive layer, however, it is not limited to these. Surlyn, bynel and the like may be used as the thermosetting resin or the thermoplastic resin. Furthermore, the adhesive layer may be used by stacking with a certain length corresponding to the area of the porous membrane needed for making the DSSC, and the area and the thickness are not limited particularly.

Preparation of Substrate B

The step of preparing substrate B may include the steps of separating the first substrate from substrate A including the first substrate having high temperature resistance, the porous membrane including the carbon-based material and the platinum nano-particles, the adhesive layer, and the second substrate, and transferring the porous membrane and the adhesive layer to a flexible substrate, by immersing the substrate A in a HF solution.

Particularly, the present invention is characterized in using the transfer method including the method of dissolving the surface of the first substrate like the glass substrate which is one of the characteristics of HF. The transfer method includes the method of separating the porous membrane 112 from the first substrate 101 having high temperature resistance, and in the method, the HF solution dissolves only the surface of the first substrate without damaging the surface of the second substrate like a plastic substrate or the adhesive layer, and the porous membrane including the carbon-based material and the platinum nano-particles is separated from the first substrate, when the substrate is immersed in the HF solution in the state of that the porous membrane including the carbon-based material and the platinum nano-particles is attached to the first substrate.

The transfer method is explained in more detail by referring to the case of that the first substrate is a glass substrate.

When substrate B is immersed in the HF solution according to the transfer method of the present invention, the first substrate is dissolved because silicon (Si) of the first substrate composed of glass has an affinity with F− of the HF solution, and thus the contact interface between the first substrate and the porous membrane is separated. Furthermore, a part of the porous membrane may be dissolved by the HF solution and the interface between the first substrate and the porous membrane contacting to the first substrate may be separated. Through such process, the porous membrane formed below the first substrate is completely separated from the bottom of the first substrate.

The volume ratio of HF solution and water of the HF solution may be 1:99 to 100:0, and preferably 1:99 to 90:10. Namely, the solution composed of only HF solution may be used in the transfer method as occasion demands. However, when the concentration of the HF solution becomes thicker, the time for separating the first substrate and the surface of the porous membrane may be shortened but there may be a dangerousness of use, a problem of storage, and a bad effect on the film of the porous membrane including the carbon-based material and the platinum nano-particles. Therefore, it is preferable that the volume ratio of HF solution and water is 1:99 to 90:10. As a preferable embodiment, the present invention immerses substrate A in the HF solution having the concentration of 1 to 90% for 1 to 100 minutes. By immersing the substrate in the HF solution, the first substrate is removed from substrate A and the porous membrane and the adhesive layer is transferred to substrate B so as to form substrate B that the second substrate 114—the adhesive layer 113—the porous membrane 112 are stacked in order.

Furthermore, the adhesive layer stacked on the porous membrane of the substrate B can prevent the porous membrane from being separated from the adhesive layer because it is bonded to the porous membrane by heat-press. Furthermore, since the adhesive layer is attached to the front face of the film, the film can be prevented from the damage caused by an external shock.

At this time, only certain parts of the porous membrane and the adhesive layer may be separated from the first substrate having high temperature resistance as much as it is needed for preparing the DSSC. Therefore, the separated porous membrane is separated as much as the area of the adhesive layer stacked on the second substrate, and the rest of the porous membrane remains on the transparent first substrate as it is.

Meanwhile, according to another embodiment of the present invention, a counter electrode for DSSC including the second substrate prepared by above method, the adhesive layer formed on one face of the second substrate, and the porous membrane including the carbon-based material and the platinum nano-particles formed on the adhesive layer wherein the second substrate is a metal substrate, a glass substrate, a plastic substrate which is a flexible substrate, a fabric substrate, or a ceramic substrate is provided.

Furthermore, the carbon-based material may be at least one selected from the group consisting of active carbon, graphite, carbon nano-tube, carbon black, and graphene, and the adhesive layer may include a thermal bonding polymer film or a thermal bonding polymer resin.

The present invention can be applied irrespective of the substrate, however, the present invention provides a flexible counter electrode for DSSC including the flexible substrate 114a which is the second substrate, the adhesive layer 113 formed on one face of the flexible substrate, and the porous membrane 112 formed on the adhesive layer and including the carbon-based material and the platinum nano-particles.

Furthermore, according to a preferable embodiment of the present invention, a DSSC including the counter electrode disclosed above, a photoelectrode arranged opposite to the counter electrode at a regular interval, and an electrolyte filling the space between the counter electrode and the photoelectrode is provided.

Figure 2:
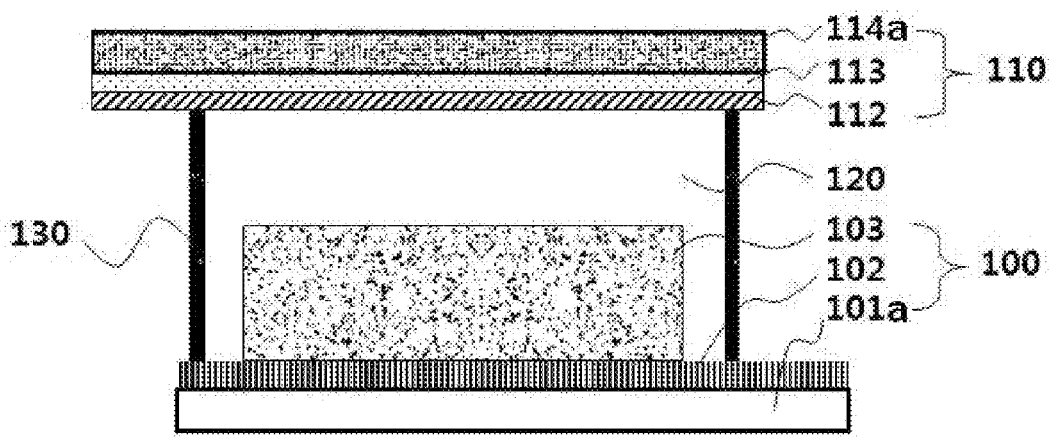
FIG. 2 is a cross-sectional drawing of the flexible DSSC according to one embodiment of the present invention.

FIG. 2 represents a schematic cross-sectional structure of the DSSC according to one embodiment of the present invention. At this time, FIG. 2 represents a flexible DSSC using a glass substrate as the first substrate having high temperature resistance and a flexible substrate as the second substrate. However, it is only for illustrating the present invention by example and the present invention is not limited to or by this.

As illustrated in FIG. 2, the DSSC according to one embodiment of the present invention includes the counter electrode 110 including the flexible substrate 114a which is the second substrate, the adhesive layer 113, and the porous membrane 112 including the carbon-based material and the platinum nano-particles, the photoelectrode 100 arranged opposite to the counter electrode 110, the electrolyte 120 filling the space between both electrodes, and the polymer adhesive 130 sealing the same.

The counter electrode having superior energy conversion efficiency can be formed on the flexible substrate in the DSSC having such structure, by transferring the porous membrane formed on the first substrate (the glass substrate) to the second substrate (the flexible substrate) according to the transfer method of the present invention disclosed above.

Meanwhile, in the present invention, the photoelectrode 100 may be formed according to a common method, and it may include the third substrate and a dye-adsorbed porous membrane.

The third substrate may be a metal substrate, a glass substrate, a plastic substrate, a fabric substrate, or a ceramic substrate. Furthermore, the third substrate means a transparent conductive electrode (TCO: transparent conducting oxide), and it may be $SnO_2$:F or ITO for example. However, the conductive film is not limited to or by above materials and general conductive films well known in the related art may be formed too.

For example, the third substrate may be coated by FTO (F-doped $SnO_2$:$SnO_2$:F), ITO, a metal electrode having the average thickness of 1 to 1000 nm, a metal nitride, a metal oxide, a carbon compound, or a conductive film including a conductive polymer.

Therefore, the photoelectrode 100 may include the third substrate 101a, the conductive film 102 formed on the third substrate, and the dye-adsorbed porous membrane 103, as illustrated in FIG. 2.

The metal nitride may be at least one selected from the group consisting of a nitride of Group IVB metallic element, a nitride of Group VB metallic element, a nitride of Group VIB metallic element, an aluminum nitride, a gallium nitride, an indium nitride, a silicon nitride, a germanium nitride, or a mixture thereof, The particle size of the metal oxide nano-particles may preferably be 10 to 100 nm. The metal oxide nano-particles may be at least one selected from the group consisting of a tin (Sn) oxide, a tin (Sn) oxide doped with antimony (Sb), niobium (Nb), or fluorine, an indium (In) oxide, an indium (In) oxide doped with tin, a zinc (Zn) oxide, a zinc (Zn) oxide doped with aluminum (Al), boron (B), gallium (Ga), hydrogen (H), indium (In), yttrium (Y), titanium (Ti), silicon (Si), or tin (Sn), a magnesium (Mg) oxide, a cadmium (Cd) oxide, a magnesium zinc (MgZn) oxide, an indium tin (InZn) oxide, a copper aluminum (CuAl) oxide, a silver (Ag) oxide, a gallium (Ga) oxide, a zinc tin oxide (ZnSnO), a titanium oxide ($TiO_2$), a zinc indium tin (ZIS) oxide, a nickel (Ni) oxide, a rhodium (Rh) oxide, a ruthenium (Ru) oxide, an iridium (Ir) oxide, a copper (Cu) oxide, a cobalt (Co) oxide, a tungsten (W) oxide, a titanium (Ti) oxide, a zirconium (Zr) oxide, a strontium (Sr) oxide, a lanthanum (La) oxide, a vanadium (V) oxide, a molybdenum (Mo) oxide, a niobium (Nb) oxide, an aluminum (Al) oxide, an yttrium (Y) oxide, a scandium (Sc) oxide, a samarium (Sm) oxide, a strontium titanium (SrTi) oxide, and a mixture thereof, and preferably a titanium oxide.

The carbon compound may be at least one selected from the group consisting of active carbon, graphite, carbon nanotube, carbon black, and graphene, and a mixture thereof.

The conductive polymer may be at least one selected from the group consisting of PEDOT (poly(3,4-ethylenedioxythiophene))-PSS(poly(styrenesulfonate)), polyaniline-CSA, pentacene, polyacetylene, P3HT (poly(3-hexylthiophene), polysiloxane carbazole, polyaniline, polyethylene oxide, (poly(1-methoxy-4-(0-disperse red 1)-2,5-phenylenevinylene), polyindole, polycarbazole, polypyridiazine, polyisothianaphthalene, polyphenylene sulfide, polyvinylpyridine, polythiophene, polyfluorene, polypyridine, polypyrrole, polysulfurnitride, and a copolymer thereof. Meanwhile, the dye-adsorbed porous membrane 103 means a nano-particle film formed by using $TiO_2$ and the like in order to form the part composing the photoelectrode including the metal oxide nano-particle layer. At this time, the thickness of the porous membrane formed on the photoelectrode is not limited particularly and it may be 1 to 40 μm preferably.

The dye-adsorbed porous membrane may be formed by using a paste including the metal oxide nano-particles, a binder, and a solvent, and a photo-sensitive dye according to a common method.

For example, the porous membrane of the photoelectrode may be formed by coating a metal oxide nano-particle paste including the metal oxide nano-particles, the binder, and the solvent on the third substrate with a certain thickness, and heat-treating the same at the temperature of 450 to 500° C. for 1 to 2 hours. And then, the photoelectrode may be prepared by carrying out the step of adsorbing the dye onto the surface of the porous membrane.

The porous membrane may includes at least one metal oxide nano-particles selected from the group consisting of a tin (Sn) oxide, a tin (Sn) oxide doped with antimony (Sb), niobium (Nb), or fluorine, an indium (In) oxide, an indium (In) oxide doped with tin, a zinc (Zn) oxide, a zinc (Zn) oxide doped with aluminum (Al), boron (B), gallium (Ga), hydrogen (H), indium (In), yttrium (Y), titanium (Ti), silicon (Si), or tin (Sn), a magnesium (Mg) oxide, a cadmium (Cd) oxide, a magnesium zinc (MgZn) oxide, an indium tin (InZn) oxide, a copper aluminum (CuAl) oxide, a silver (Ag) oxide, a gallium (Ga) oxide, a zinc tin oxide (ZnSnO), a titanium oxide ($TiO_2$), a zinc indium tin (ZIS) oxide, a nickel (Ni) oxide, a rhodium (Rh) oxide, a ruthenium (Ru) oxide, an iridium (Ir) oxide, a copper (Cu) oxide, a cobalt (Co) oxide, a tungsten (W) oxide, a titanium (Ti) oxide, a zirconium (Zr) oxide, a strontium (Sr) oxide, a lanthanum (La) oxide, a vanadium (V) oxide, a molybdenum (Mo) oxide, a niobium (Nb) oxide, an aluminum (Al) oxide, an yttrium (Y) oxide, a scandium (Sc) oxide, a samarium (Sm) oxide, a strontium titanium (SrTi) oxide, and a mixture thereof.

Furthermore, the photo-sensitive dye may be a dye which has a band gap of 1.55 eV to 3.1 eV and can absorb visible rays, and it may include an organic-inorganic composite dye including a metal or a metal complex, an organic dye, or a mixture thereof for example. As the example of the organic-inorganic composite dye, an organic-inorganic composite dye including an element selected from the group consisting of aluminum (Al), platinum (Pt), palladium (Pd), europium (Eu), lead (Pb), iridium (Ir), ruthenium (Ru), and a complex thereof may be used.

Though the electrolyte 120 is simply illustrated as the filled form in FIG. 2 for convenience, the electrolyte is in fact uniformly dispersed in the carbon-based material and the platinum nano-particles of the porous membrane 112 in the space between the photoelectrode 100 and the counter electrode 110.

The electrolyte includes an oxidation-reduction derivative which receives electrons from the counter electrode by oxidation-reduction and delivers the electrons to the dye of the photoelectrode, and it is not limited particularly if it can be used to common DSSCs. Particularly, the oxidation-reduction derivative may preferably be at least one selected from the group consisting of electrolytes including iodine (I), bromine (Br), cobalt (Co), thiocyanate (SCN—), or selenium cyanide (SeCN—). Furthermore, the electrolyte may include at least one polymer selected from the group consisting of polyvinylidenefluoride-co-polyhexafluoropropylene, polyacrylonitrile, polyethyleneoxide, and polyalkylacrylate. Furthermore, the electrolyte may be a polymer gel electrolyte including at least one inorganic particles selected from the group consisting of silica and $TiO_2$ nano-particles.

Furthermore, the solar cell may further include an adhesive which is a thermal bonding polymer film or paste for sealing the semiconductor electrode and the counter electrode, and at this time, the adhesive used may be a common material and the kind is not limited particularly.

According to the present invention, it is possible to prepare the counter electrode including the porous membrane including the carbon-based material and the platinum nano-particles formed on the second substrate, by transferring the porous membrane including the carbon-based material and the platinum nano-particles which is formed on the first substrate having high temperature resistance like the glass substrate by the calcination at high temperature to the second substrate like the plastic substrate by the transfer method using the HF solution.

Therefore, the present invention can provide the porous type counter electrode which maintains higher conductivity than a thin membrane and in which the electrolyte moves smoothly, and the counter electrode can have more excellent stability by using the film calcinated at high temperature which cannot be used to existing plastic substrates. Moreover, since the adhesive layer is attached to the front face of the film of the counter electrode of the present invention, the film can be prevented from the damage caused by an external shock.

Furthermore, the present invention can provide the counter electrode for flexible DSSC using an inexpensive high efficient plastic substrate because it can exclude the expensive transparent conductive film and do not need a vacuum device. Furthermore, it is possible to provide a high efficient solar cell without damaging the film, because various substrates disclosed above can be applied thereto instead of the flexible substrate.

Hereinafter, examples of the present invention are disclosed. However, the following examples are only for illustrating the present invention, and the scope of the present invention is not determined to or by them.

EXAMPLE 1

(Preparation of Photoelectrode)

The glass substrate having conductivity (Philkington Co., material: FTO, thickness 2.2 cm, 8 Ω/sq, the substrate including 101a and 102 of FIG. 2) was prepared as the substrate for the photoelectrode. Successively, the porous membrane (thickness: 9 μn) including metal oxide nano-particles was formed thereon by coating metal oxide nano-particle paste including titanium oxide nano-particles (average particle diameter: 20 nm) 18.5 weight %, binder polymer (ethylcellulose) 0.05 weight %, and the residual quantity of solvent (terpineol) on the glass substrate (by using doctor blade method), and heat-treating the substrate at 500° C. for 30 minutes.

Continually, the photoelectrode was prepared by immersing the substrate in an ethanol solution including 0.5 mM photosensitive dye [Ru(4,4'-dicarboxy-2,2'-bipyridine)$_2$(NCS)$_2$] for 12 hours so that the photosensitive dye adsorbed to the surface of the porous membrane.

(Preparation of Counter Electrode)

The glass substrate (thickness: 1 mm) was prepared as the substrate for the counter electrode. Successively, the carbon nano-particle paste including carbon nano-particles (average particle diameter, 2 um, carbon black) 18.5 weight %, a binder polymer (ethylcellulose) 0.05 weight %, and the residual quantity of the solvent (terpineol) was prepared. And then, 10 weight % of 50 mM Pt solution was fed to the carbon nano-particle paste and the paste was stirred for 2 hours. The porous membrane (thickness: 12 μm) including the carbon nano-particle based material and the platinum nano-particles was prepared by coating the well dispersed paste on the glass substrate (by using doctor blade method), and heat-treating the substrate at 450° C. for 30 minutes. Continually, a transparent adhesive layer (surlyn, bynel, thickness 25 μm) was put on the porous membrane including the carbon based material and the platinum nano-particles, a plastic substrate (material: PEN, thickness 200 μm) was put thereon, and the substrate was heat-pressed for 10 seconds by using a press apparatus (upper plate/lower plate: 80° C./100° C., pressure 1 bar). After attaching the porous membrane formed on the glass substrate, the transparent adhesive layer (surlyn, bynel), and the transparent plastic substrate according to such process, the substrate was immersed in % HF solution for 20 seconds so that the porous membrane including the carbon nano-particle based material and the platinum nano-particles was separated from the glass substrate and attached to the plastic substrate by the adhesive layer therebetween.

Through the process, the counter electrode including the counter electrode and the catalyst layer on the plastic substrate (the counter electrode 110 of FIG. 2 composed of the porous membrane 112, the adhesive layer 113, and the second substrate 114a) was prepared.

Figure 5:
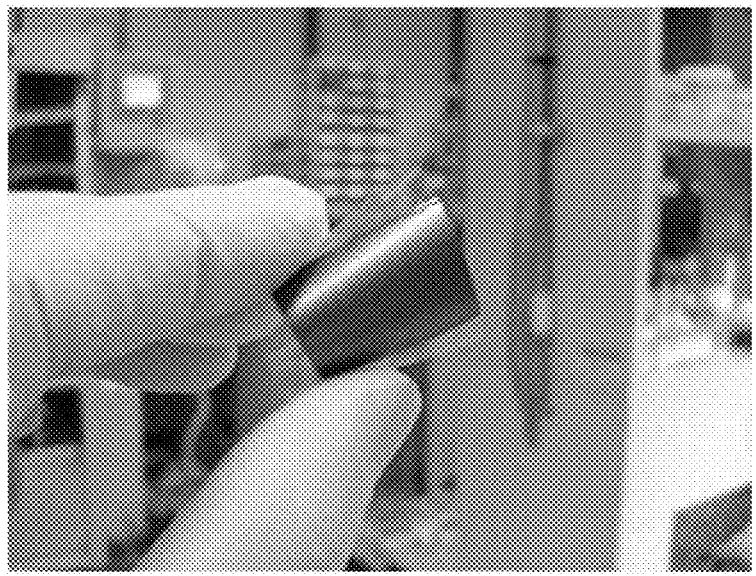
FIG. 5 is a photograph of the flexible counter electrode according to one embodiment of the present invention.
Figure 6:
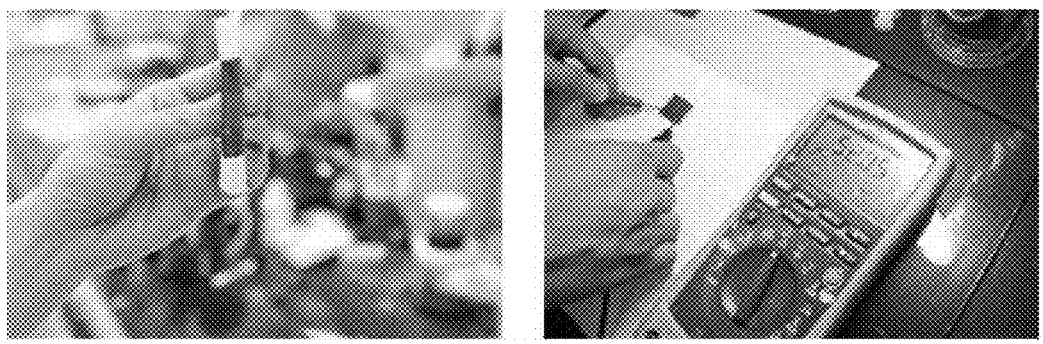
FIG. 6 is a photograph of the counter electrode according to one embodiment of the present invention which was applied to microfibers.

FIG. 4 is SEM photographs of the flexible counter electrodes according to Example 1 (a) of the present invention and Comparative Example 1 (b). And, FIG. 5 is a photograph of the flexible counter electrode according to the present invention. The counter electrode can also be applied to fabrics or microfibers, and FIG. 6 represents a photograph of the counter electrode according to the present invention which is applied to microfibers and showing conductivity.

(Injection of Electrolyte, and Sealing Cell)

The DSSC having the structure of FIG. 2 was prepared by injecting an acetonitrile electrolyte including PMII (1-methyl-3-propylimidazolium iodide, 0.7M) and I$_2$ (0.03M) in the space between the photoelectrode and the counter electrode prepared above, and sealing the same with a common polymer resin.

COMPARATIVE EXAMPLE 1

Preparation of Photoelectrode

The glass substrate having conductivity (Philkington Co., material: FTO, thickness 2.2 cm, 8 Ω/sq, the substrate including 101a and 102 of FIG. 3) was prepared as the substrate for the photoelectrode. Successively, the porous membrane (thickness: 9 μm) including metal oxide nano-particles was formed thereon by coating metal oxide nano-particle paste including titanium oxide nano-particles (average particle diameter: 20 nm) 18.5 weight %, binder polymer (ethylcellulose) 0.05 weight %, and the residual quantity of solvent (terpineol) on the glass substrate (by using doctor blade method), and heat-treating the substrate at 500° C. for 30 minutes.

Continually, the photoelectrode was prepared by immersing the substrate in an ethanol solution including 0.5 mM photosensitive dye [Ru(4,4'-dicarboxy-2,2'-bipyridine)$_2$(NCS)$_2$] for 12 hours so that the photosensitive dye adsorbed to the surface of the porous membrane.

(Preparation of Counter Electrode)

The film that Pt/Ti alloy (catalyst layer) of 30 nm thickness was coated on the plastic substrate having conductivity (Peccell Technologies Co., material: PEN, thickness 188 μm, 5 Ω/sq) was used as the substrate for the counter electrode (the counter electrode 110 of FIG. 3 composed of the catalyst layer 111, the conductive film (TCO) 102, and the flexible transparent substrate 101).

(Injection of Electrolyte, and Sealing Cell)

Figure 3:
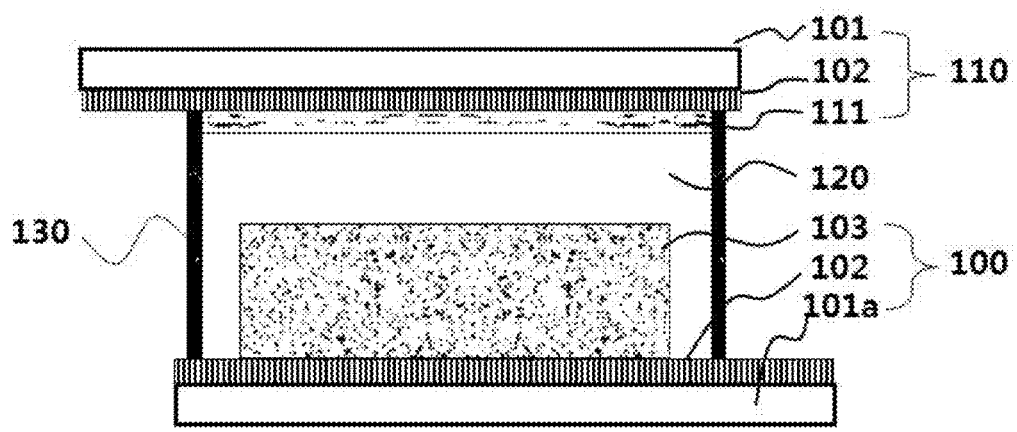
FIG. 3 is a cross-sectional drawing of the DSSC using the counter electrode that platinum catalyst is deposited on PEN/ITO substrate by using existing vacuum device.

The DSSC having the structure of FIG. 3 was prepared by injecting an acetonitrile electrolyte including PMII (1-methyl-3-propylimidazolium iodide, 0.7M) and I$_2$ (0.03M) in the space between the photoelectrode and the counter electrode prepared above, and sealing the same with a common polymer resin.

EXPERIMENTAL EXAMPLE 1

Open-circuit voltage, photocurrent density, energy conversion efficiency, and fill factor of each dye-sensitized solar cell prepared in Example 1 and Comparative Example 1 were measured by the following method, and the results are listed in the following Table 1. Furthermore, the current-voltage curves of the DSSCs of Example 1 and Comparative Example 1 which were obtained in AM 1.5G 1 Sun condition were illustrated in FIG. 7 in comparison.

(1) Open-Circuit Voltage (V) and Photocurrent Density (mA/cm$^2$)

: Open-circuit voltage and photocurrent density were measured by using Keithley SMU2400.

(2) Energy Conversion Efficiency (%), and Fill Factor (%)

: Energy conversion efficiency was measured by using a solar simulator (consisting of Xe lamp [1600W, YAMASHITA DENSO], AM1.5 filter, and Keithley SMU2400) of 1.5 AM 100 mW/cm$^2$, and fill factor (FF) was calculated from the conversion efficiency according to the following Calculation Formula:

$$\text{Fill factor (\%)} = \frac{(J \times V)_{max}}{J_{sc} \times V_{oc}} \times 100 \quad \text{[Calculation Formula]}$$

wherein J is y-axis value of conversion efficiency curve, V is x-axis value of conversion efficiency curve, and $J_{sc}$ and $V_{oc}$ are intercepts of each axis.

TABLE 1

| | Jsc (mA/cm$^2$) | Voc (V) | FF (%) | Efficiency (%) | Area (cm$^2$) | TiO$_2$ Thickness (μm) |
| --- | --- | --- | --- | --- | --- | --- |
| Example 1 | 12.55 | 0.717 | 0.652 | 5.87 | 0.475 | 12 |
| Comparative Example 1 | 12.92 | 0.720 | 0.681 | 6.33 | 0.379 | 12 |

Figure 7:
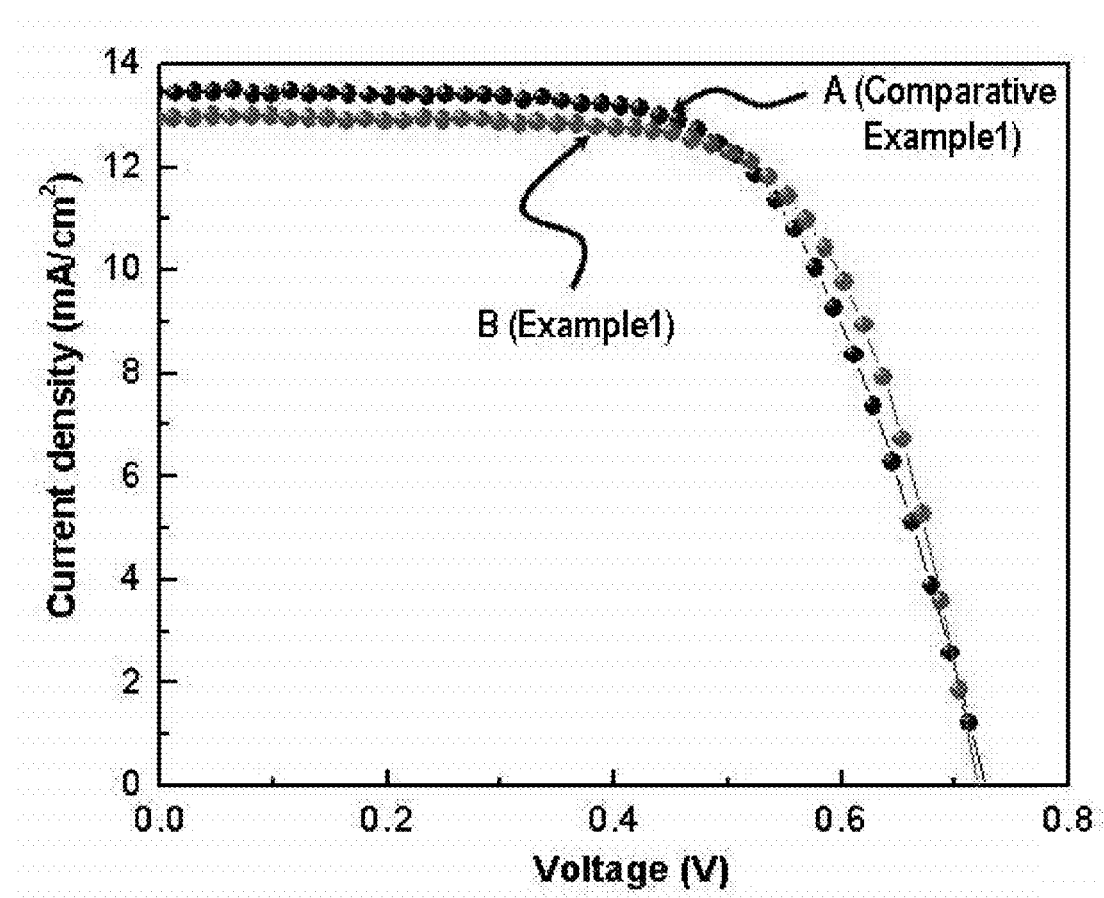
FIG. 7 is a graph illustrating the current-voltage curves of the DSSCs according to Example 1 of the present invention and Comparative Example 1 in comparison.

As shown in Table 1 and FIG. 7, it can be recognized that the DSSC of Example 1 including the counter electrode prepared by transferring the calcinated carbon and platinum nano-particles to the flexible substrate shows better FF compared to area than the DSSC of Comparative Example 1 using the electrode prepared by sputtering Pt on existing PEN/ITO substrate, and shows better efficiency due to such FF.

Therefore, the solar cell of the present invention can be applied to various electronics industries demanding flexibility and the fields needing a power supply, because the solar cell excludes the expensive transparent conductive film, and the electrode formed on the flexible plastic substrate by the calcination at high temperature includes the carbon and the platinum nano-particles which are superior in efficiency and have high conductivity.

What is claimed is:

1. A method of preparing a counter electrode for dye-sensitized solar cell (DSSC), including the steps of:
preparing substrate A including a first substrate which has high temperature resistance and is not deformed at the temperature of 500° C. or less, a porous membrane including a carbon-based material and platinum nano-particles, an adhesive layer, and a second substrate; and
preparing substrate B including the second substrate, and the adhesive layer and the porous membrane formed on the second substrate, by separating the first substrate having high temperature resistance from substrate A and transferring the porous membrane and the adhesive layer to the second substrate with a transfer method, wherein the carbon-based material is at least one selected from the group consisting of active carbon, graphite, carbon black, and graphene,
the particle sizes of the carbon-based material and the platinum nano-particle are 10nm to 100 μ m, respectively, and
wherein the step of preparing substrate A includes the steps of:
forming the porous membrane including the carbon-based material and the platinum nano-particles on one face of the first substrate having high temperature resistance, and
stacking the adhesive layer and the second substrate on the porous membrane including the carbon-based material and the platinum nano-particles in order, and heat-pressing the substrate A.

2. The method of preparing a counter electrode for DSSC according to claim 1, wherein the porous membrane is formed by coating a paste including the carbon-based material, the platinum nano-particle, a binder, and a solvent on one face of the first substrate having high temperature resistance, and heat-treating the same at the temperature of 450 to 500° C. for 1 to 2 hours.

3. The method of preparing a counter electrode for DSSC according to claim 1, wherein the step of preparing substrate B includes the steps of:
separating the first high temperature resistant substrate from the substrate A including the first high temperature resistant substrate, the porous membrane including the carbon-based material and the platinum nano-particle, the adhesive layer, and the second substrate and transferring the porous membrane and the adhesive layer to a flexible substrate, by immersing the substrate A in a HF solution.

4. The method of preparing a counter electrode for DSSC according to claim 3, wherein the volume ratio of HF solution and water of the HF solution is 1:99 to 100:0.

5. The method of preparing a counter electrode for DSSC according to claim 1, wherein the adhesive layer comprises a thermal bonding polymer film, a paste including a thermal bonding polymer, or an adhesive, and
it is formed by using at least one compounds selected from the group consisting of a thermosetting resin, a thermoplastic resin, an UV resin, an acrylic resin, an acrylic resin anaerobic, an acrylic emulsion, acrylic pressure-sensitive adhesive tapes, .alpha.-olefin resin, a polyurethane resin, a polyurethane solvent type, an urethane emulsion, a polyurethane hot melt, a reactive hot melt adhesive, an ethercellulose, an ethylene-vinylacetate copolymer emulsion, an ethylene-vinylacetate copolymer hot melt, an epoxy resin, an epoxy emulsion, a polyvinyl chloride solvent type, a polyvinyl acetate emulsion, a polychloroprene rubber, .alpha.-cyanoacrylate, silicone adhesives, modified silicone adhesives, a water based polymer-isocyanate, a styrene-butadiene rubber solution type, a styrene-butadiene rubber latex, a nitrile rubber, a nitrocellulose, a phenolic resin, a polyamide hot melt, a polyimide, a polyolefin hot melt, a polyvinyl acetate solvent type, a polystyrene solvent type, a polyvinylalcohol, a polyvinylpyrrolidone, a polyvinylbutyral, a polybenzimidazole, a polymethylmethacrylate solvent type, a polymethylmethacrylate solvent type, an urea resin, and an urea resin.

6. The method of preparing a counter electrode for DSSC according to claim 1, wherein the first substrate having high temperature resistance is a metal substrate, a glass substrate, or a ceramic substrate, and the second substrate is a metal substrate, a glass substrate, a plastic substrate which is a flexible substrate, a fabric substrate, or a ceramic substrate.

7. The method of preparing a counter electrode for DSSC according to claim 6, wherein the second substrate is at least one plastic substrates selected from the group consisting of polyethylene terephthalate; polyethylene naphthalate; polycarbonate;

polypropylene; polyimide; triacetylcellulose, polyether sulfone, an organic modified silicate of 3-dimensional network structure which is formed by hydrolysis-condensation reaction of at least one organic metal alkoxides selected from the group consisting of methyltriethoxysilane, ethyltriethoxysilane, and propyltriethoxysilane; a copolymer thereof; and a mixture thereof.

* * * * *